# (12) United States Patent
Asanuma et al.

(10) Patent No.: US 8,356,408 B2
(45) Date of Patent: Jan. 22, 2013

(54) METHOD OF MANUFACTURING AN INFLATOR

(75) Inventors: Junichi Asanuma, Aichi-ken (JP); Yoshitaka Kashitani, Aichi-ken (JP); Keisuke Mori, Aichi-ken (JP); Takashi Araki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 744 days.

(21) Appl. No.: 12/457,671

(22) Filed: Jun. 18, 2009

(65) Prior Publication Data
US 2009/0313821 A1 Dec. 24, 2009

(30) Foreign Application Priority Data
Jun. 20, 2008 (JP) ................ 2008-162130

(51) Int. Cl.
*B23P 17/00* (2006.01)
*B60R 21/26* (2006.01)
*F17C 1/00* (2006.01)

(52) U.S. Cl. ............. 29/888; 29/428; 220/361; 220/581

(58) Field of Classification Search ............ 29/428, 29/888, 890.12, DIG. 89; 53/83, 403; 102/530; 219/137 R; 280/736, 741, 737; 220/581, 220/361
See application file for complete search history.

(56) References Cited

U.S. PATENT DOCUMENTS

| | | | | |
|---|---|---|---|---|
| 2,380,811 A | * | 7/1945 | Walker | 445/43 |
| 3,426,170 A | * | 2/1969 | Miller | 219/74 |
| 3,914,000 A | * | 10/1975 | Beckerman et al. | 445/25 |
| 4,262,472 A | * | 4/1981 | Soeda et al. | 53/403 |
| 4,478,788 A | * | 10/1984 | Rozmus et al. | 419/48 |
| 5,566,853 A | * | 10/1996 | Schenker et al. | 220/581 |
| 5,673,731 A | | 10/1997 | Green et al. | |
| 5,673,933 A | * | 10/1997 | Miller et al. | 280/736 |

(Continued)

FOREIGN PATENT DOCUMENTS
DE 4436016 A1 4/1996
DE 19716827 A1 11/1997
(Continued)

OTHER PUBLICATIONS

German Office Action mailed on Sep. 14, 2010 issued from the German Patent Office in the corresponding German patent application No. 10 2009 025 573.7-21 (with English translation).

*Primary Examiner* — Alexander P Taousakis
(74) *Attorney, Agent, or Firm* — Posz Law Group, PLC

(57) ABSTRACT

At the time of manufacturing an inflator, a blocking body is first disposed at an opening so as to allow the interior and the exterior of a housing to communicate with each other. The blocking body is abutted against a peripheral edge of the opening so as to ensure sealability between the blocking body and the peripheral edge of the opening. A filling nozzle injecting a pressurized gas is then pressed against a periphery of an inlet port of the blocking body, and the pressurized gas is injected from the filling nozzle so as to fill the pressurized gas into the housing through a filling channel. Subsequently, to block the filling channel, the blocking body is energized with a resistance-welding current to resistance-weld an inner peripheral portion of the filling channel. At the same time, the blocking body is fixed to the peripheral edge of the opening by resistance-welding so as to maintain sealability, thereby manufacturing the inflator.

8 Claims, 7 Drawing Sheets

U.S. PATENT DOCUMENTS

| | | | |
|---|---|---|---|
| 5,674,417 A | 10/1997 | Schaugaard et al. | |
| 6,382,456 B1 * | 5/2002 | Onishi et al. | 220/581 |
| 7,108,281 B2 | 9/2006 | Butler et al. | |
| 7,461,860 B2 * | 12/2008 | Ryan et al. | 280/741 |
| 7,966,787 B2 * | 6/2011 | Guo et al. | 53/405 |
| 8,037,905 B2 * | 10/2011 | Sparkman et al. | 141/4 |
| 2010/0059975 A1 * | 3/2010 | Sattler et al. | 280/741 |

FOREIGN PATENT DOCUMENTS

| | | |
|---|---|---|
| DE | 102004038096 A1 | 8/2005 |
| JP | A-2000-227199 | 8/2000 |

* cited by examiner

METHOD OF MANUFACTURING AN INFLATOR

BACKGROUND OF THE INVENTION

1. Field of the Invention

The present invention relates to a method of manufacturing an inflator of a hybrid type or a stored type having a construction in which a pressurized gas for supplying to an air bag as an inflation gas is filled.

2. Related Art

Conventionally, in an inflator of a type which is constructed by filling a pressurized gas into the interior of a housing (also called a bottle), an opening for filling the pressurized gas is formed in the housing. After the filling of the pressurized gas, this opening is blocked by a blocking body (also called a welding pin) which is welded to the peripheral edge of the opening by resistance-welding (e.g., refer to JP-A-2000-227199).

In the manufacture of such an inflator, the peripheral edge of the opening of the housing is covered with a cylindrical cover while ensuring sealability (gastightness), and the blocking body is disposed in the opening so as to be inserted into the opening with a gap provided between the blocking body and the inner peripheral surface of the opening. Further, an electrode for resistance-welding is disposed above the blocking body. Subsequently, the pressurized gas which is supplied from a pressurized gas source is caused to flow into the cover, and the pressurized gas which flowed in is filled in the housing through the gap between the blocking body and the inner peripheral surface of the opening. Upon completion of the filling of the pressurized gas into the housing, in the state in which the cover is pressed against the peripheral edge of the opening to ensure gastightness, the electrode is lowered so as to press the blocking body. While the blocking body is being pressed against the peripheral edge of the opening, the blocking body is energized with a resistance-welding current to thereby resistance-weld the blocking body to peripheral edge of the opening and fix the blocking body so as to block the opening, thereby manufacturing the inflator.

However, with the conventional method of manufacturing an inflator, the blocking body is not fixed to the peripheral edge of the opening in the atmospheric environment. Namely, under the pressure (35 to 55 MPa) of the pressurized gas being filled into the housing, the blocking body is resistance-welded while ensuring gastightness by the cover for the surroundings of the opening, the blocking body, and the electrode for resistance-welding so that gas leakage is absent. For this reason, a filling device which is equipped with a filling nozzle and the electrode becomes complex including the sealing structure of a movable portion of the electrode in the cover. Hence, there has been leeway for improvement in the manufacture of the inflator in a simple manner.

SUMMARY OF THE INVENTION

The present invention has been devised to overcome the above-described problem, and its object is to provide a method of manufacturing an inflator which is manufactured easily and at low cost by using a filling device having a simple construction.

To attain the above object, in accordance with a first aspect of the invention there is provided a method of manufacturing an inflator which is manufactured by filling into a housing a pressurized gas for supplying to an air bag as an inflation gas, comprising: a housing preparing step in which the housing having an opening for the pressurized gas; a blocking body preparing step in which a blocking body which blocks the opening and through which a filling channel filling the pressurized gas into the housing is provided; a blocking body setting step which is a step after undergoing the housing preparing step and the blocking body preparing step, the blocking body setting step being a step in which the blocking body is disposed in the opening such that an outlet port of the filling channel for the pressurized gas is oriented toward an inner side of the housing, while an inlet port of the filling channel for the pressurized gas is oriented toward an outer side of the housing, so that an interior and an exterior of the housing are communicated with each other through the filling channel; a blocking body abutment step which is a step after undergoing the blocking body setting step, the blocking body abutment step being a step in which the blocking body is abutted against a peripheral edge of the opening so as to ensure sealability between the blocking body and the peripheral edge of the opening; a filling nozzle disposing step which is a step after undergoing the blocking body abutment step or a step which is performed simultaneously with the blocking body abutment step, the blocking body disposing step being a step in which a filling nozzle injecting the pressurized gas is pressed against the periphery of the inlet port of the blocking body so as to ensure sealability; a pressurized gas filling step which is a step after undergoing the filling nozzle disposing step, the pressurized gas filling step being a step in which the pressurized gas is injected from the filling nozzle to fill the pressurized gas into the housing through the filling channel; a filling channel blocking step which is a step after undergoing the pressurized gas filling step, the filling channel blocking step being a step in which the blocking body is energized with a resistance-welding current so as to block the filling channel by fusion-solidifying an inner peripheral surface of the filling channel, to thereby resistance-weld the inner peripheral portion of the filling channel; and a blocking body fixing step for fixing the blocking body to the peripheral edge of the opening so as to allow sealability to the maintained, wherein the blocking body fixing step is performed simultaneously with the blocking body abutment step or after the blocking body abutment step.

In the method of manufacturing an inflator in accordance with the invention, the pressurized gas filling step is performed after undergoing the filling nozzle disposing step at the time of the filling of the pressurized gas into the housing. Subsequently, in the filling channel blocking step, the filling channel of the blocking body is blocked by making use of resistance-welding, thereby manufacturing the inflator.

Further, the fixing step (blocking body fixing step) with sealability maintained between the blocking body and the peripheral edge of the opening is performed simultaneously with the blocking body abutment step or after the blocking body abutment step. Namely, in a case where, for example, the blocking body fixing step is performed simultaneously with the blocking body abutment step, the blocking body abutment step is a step after undergoing the blocking body setting step, and is a step in which the blocking body is abutted against the peripheral edge of the opening so as to ensure sealability between the blocking body and the peripheral edge of the opening. Concurrently at this time, if the blocking body fixing step for fixing the blocking body to the housing is performed by a fixing operation based on resistance-welding or based on welding other than resistance-welding, such as arc welding or blazing, or based on threaded joint, press fitting such as interference fit, bonding, or the like, this fixing operation is an operation which is performed prior to the filling of the pressurized gas, and can be performed in the atmospheric environment. Alternatively, even if the blocking body fixing step is performed after the blocking body abutment step, e.g., after the pressurized gas filling step, in the pressurized gas filling step, since the sealability between the blocking body and the peripheral edge of the opening has already been ensured in the blocking body abutment step, after the filling nozzle disposing step of pressing the filling nozzle against the periphery of the inlet port of the blocking body, if the pressurized gas is injected from the filling nozzle, the pressurized gas is filled into the housing through the filling channel without gas leakage, and the pressurized gas filling step can be completed smoothly. Further, after the pressurized gas filling step, if the state of the filling nozzle disposing step is maintained for pressing the filling nozzle against the periphery of the inlet port of the blocking body while maintaining the sealability, it is possible to maintain the state in which the leakage of the pressurized gas from the housing and the blocking body is absent, due also to the fact that the sealability between the blocking body itself and the peripheral edge of the opening has already been ensured in the blocking body abutment step. For this reason, in the fixing step at the time of performing the blocking body fixing step for fixing the blocking body to the housing after the pressurized gas filling step, fixing portions of the blocking body and the peripheral edge of the opening can be kept exposed to the atmosphere. It goes without saying that, even before the pressurized gas filling step after the blocking body abutment step, the fixing portions of the blocking body and the peripheral edge of the opening can be kept exposed to the atmosphere.

As described above, even if the blocking body fixing step is performed simultaneously with the blocking body abutment step or after the blocking body abutment step, in either case, the fixing portions of the blocking body and the peripheral edge of the opening can be fixed by a fixing operation such as welding in the atmospheric environment (under normal pressure) in which they are exposed to the atmosphere. Further, as the filling device having the filling nozzle and the electrodes at the time of filling the pressurized gas, by merely securing a structure whereby the filling nozzle is pressed against the periphery of the inlet port of filling channel in the blocking body so as to provide a seal, it is possible to provide a simplified structure without needing to provide a conventional large cover for surrounding the peripheral edge of the opening while ensuring sealability.

Accordingly, in the method of manufacturing an inflator in accordance with the invention, the inflator can be manufactured easily at low cost by using the filling device having the simplified structure.

Furthermore, the blocking body abutment step may be provided as a step of ensuring sealability between the blocking body and the peripheral edge of the opening by pressing the blocking body against the peripheral edge of the opening while in abutment therewith, and the blocking body fixing step may be performed after the blocking body abutment step. Namely, if the blocking body abutment step in the case where the blocking body fixing step is performed after the blocking body abutment step is provided as a step of ensuring sealability between the blocking body and the peripheral edge of the opening by pressing the blocking body against the peripheral edge of the opening while in abutment therewith, the blocking body abutment step can be easily completed merely by the pressing operation of pressing the blocking body against the peripheral edge side of the opening.

In addition, if the blocking body fixing step is provided as a step for fixing the blocking body to the peripheral edge of the opening by resistance-welding, a resistance-welding power supply or the like which is used for resistance-welding at the time of blocking the filling channel can be used for joint purposes. As compared with a case where other fixing means for such as welding including arc welding are used, it is possible to reduce the number of equipment used, so that the inflator can be manufactured more easily and at lower cost.

It goes without saying that the blocking body fixing step which is performed by resistance-welding can be performed simultaneously with the filling channel blocking step by making use of the resistance-welding electrodes themselves which are used in resistance-welding at the time of blocking the filling channel. In that case, the inflator can be manufactured while further reducing the number of equipment used.

In addition, if the filling nozzle also serves as the electrode for resistance-welding which is used in the filling channel blocking step, the filling nozzle used in the pressurized gas filling step can be pressed against the periphery of the inlet port of the filling channel in the blocking body. Thus, the operation can proceed automatically and speedily to the filling channel blocking step in the state in which the sealability of the periphery of the inlet port has been ensured, and the filling channel blocking step can be completed automatically and speedily.

Further, an arrangement may be provided such that when the filling nozzle is brought into pressure contact with the periphery of the inlet port of the blocking body, the filling nozzle presses the blocking body itself against the peripheral edge of the opening while in abutment therewith. In this case as well, it is unnecessary to separately provide a pressing member for pressing the blocking body in the blocking body abutment step, so that the inflator can be manufactured while reducing the number of equipment used.

In this case, the end portion of the blocking body on the outlet port side of the filling channel may be formed into a tapered shape so as to be inserted into the inner peripheral side of the opening and to allow its outer peripheral surface to be brought into pressure contact with the entire circumference of the peripheral edge of the opening while ensuring sealability at the time of pressing in the inserting direction. In such a construction, at the time of the pressing of the filling nozzle against the blocking body in the filling nozzle disposing step, the blocking body can be pushed into the opening, and the blocking body can be brought into pressure contact with the peripheral edge of the opening while ensuring sealability.

It should be noted that the filling nozzle may be so constructed so as to also serve as the electrode for resistance-welding which is used in the blocking body fixing step. In this case, prior to the pressurized gas filling step, the blocking body abutment step and the blocking body fixing step may be performed simultaneously by resistance-welding the blocking body to the peripheral edge of the opening. Alternatively, the blocking body fixing step may be performed simultaneously with the filling channel blocking step.

With the inflator which is manufactured by the above-described manufacturing method, the inflator can be manufactured easily and at low cost by using the filling device which has a simple construction and for which it is unnecessary to provide a conventional cover.

DETAILED DESCRIPTION OF THE PREFERRED EMBODIMENTS

Figure 1:
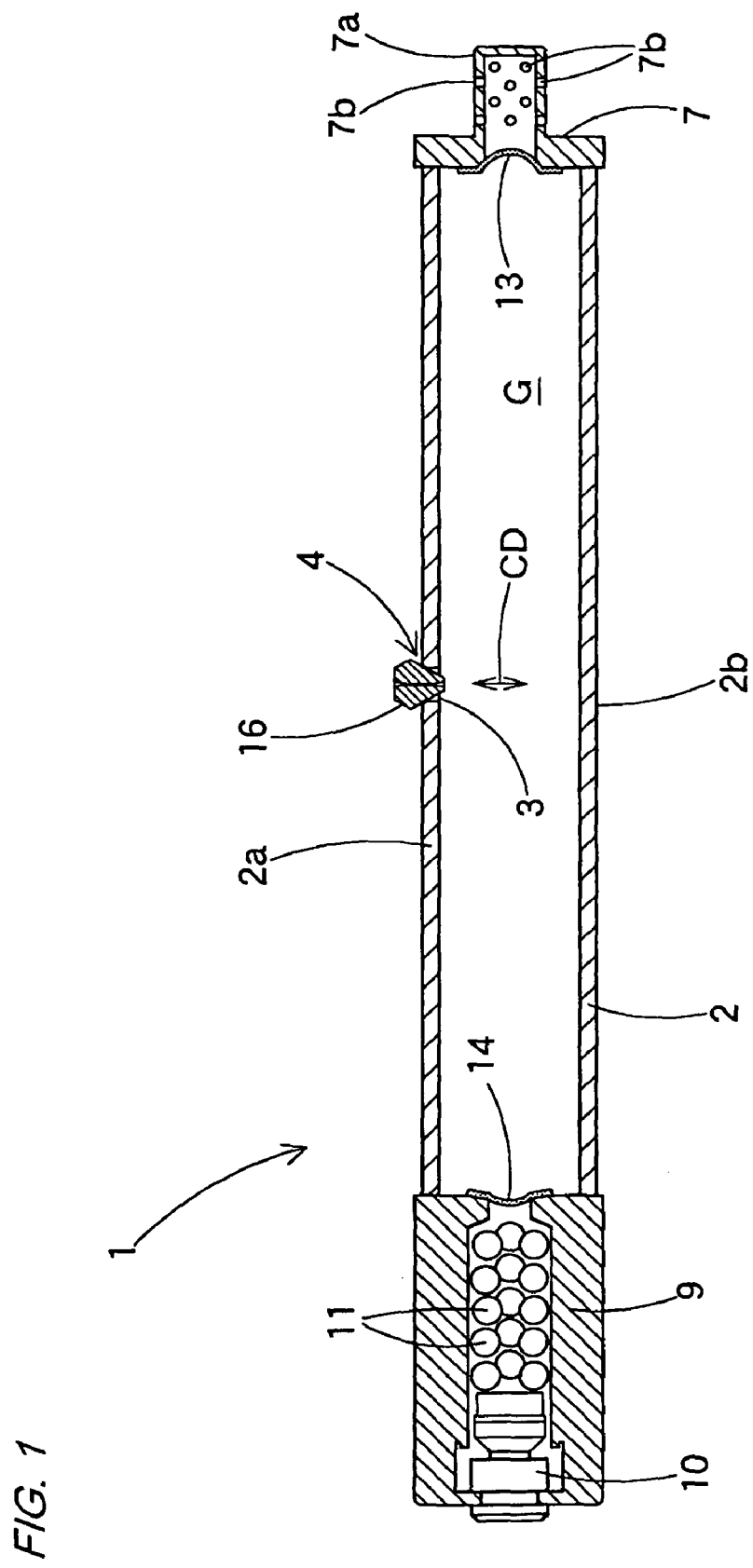
FIG. 1 is a cross-sectional view illustrating an inflator in accordance with a first embodiment of the invention.

Hereafter, a description will be given of an embodiment of the invention with reference to the drawings. An inflator 1 which is manufactured by a manufacturing method in accordance with a first embodiment is for supplying an inflation gas to an air bag of an air bag apparatus which is mounted in a motor vehicle. This inflator 1 is of a hybrid type in which a combustion gas of a gas generating agent 11 and a filled pressurized gas G consisting of an inert gas such as argon are used as gas for inflating an air bag. The inflator 1 is constructed such that a discharge-side mouth portion 7 is secured to a front end side of a substantially cylindrical housing 2 by welding or the like, and a squib-side mouth portion 9 holding the gas generating agent 11 and a squib 10 for igniting the gas generating agent 11 is secured to a rear end side of the housing 2 by welding or the like. The discharge-side mouth portion 7 has a head portion 7a provided projectingly and provided with a plurality of gas discharge ports 7b.

Rupture plates 13 and 14, which burst by a shock wave due to the ignition of the squib 10 and an increase of internal pressure consequent upon the firing of the gas generating agent 11, are respectively disposed in portions of the housing 2 bordering the discharge-side mouth portion 7 and the squib-side mouth portion 9. The pressurized gas G is filled in the housing 2 between the rupture plates 13 and 14 at a pressure of 35 to 70 MPa or thereabouts. During the operation of this inflator 1, the squib 10 is ignited, the gas generating agent 11 fired by the squib 10 generated a combustion gas to burst the rupture plate 14. Further, the rupture plate 13 bursts due to an increase of the internal pressure within the housing 2, so that the combustion gas of the gas generating agent 11 and the pressurized gas G are discharged from the gas discharge ports 7b.

This housing 2 is formed of a metal pipe which is made of such as steel or low carbon steel and which is resistance-weldable and secures pressure resistance. An opening (filling opening) 3, which is for filling the pressurized gas G and is blocked by a blocking body 16, is disposed in the vicinity of a longitudinal center of its outer peripheral wall 2a. This opening 3 is open with a circular shape and penetrates the outer peripheral wall 2a of the housing 2 such that the axial direction CD of the opening 3 is perpendicular to the axial direction of the substantially cylindrical housing 2.

Figure 2:
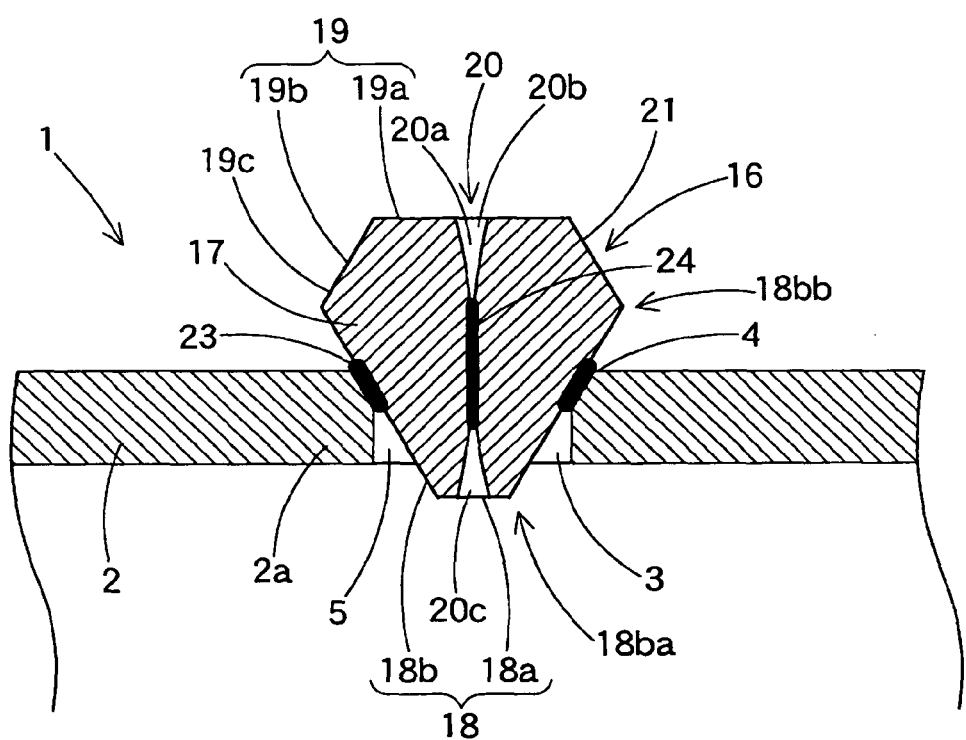
FIG. 2 is an enlarged cross-sectional view of an opening and its vicinity of the inflator in accordance with the first embodiment.

The blocking body 16 is formed of a resistance-weldable metallic material such as low carbon steel in the same way as the housing 2, and is welded to a peripheral edge 4 of the opening 3 by resistance-welding. The blocking body 16 is formed of a plug material 17 (see FIGS. 2 to 3C) which extends along the axial direction CD of the opening 3 such that its proximal side end portion 18 at a welded peripheral portion 23 is welded to the peripheral edge 4 of the opening 3, and its distal end portion 19 projects from the peripheral edge 4 of the opening 3.

Figure 3A:
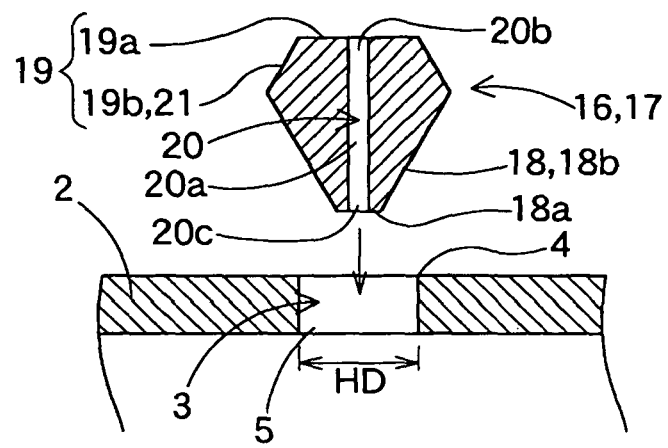
FIGS. 3A to 3C are diagrams explaining steps of manufacturing the inflator in accordance with the first embodiment.
Figure 3B:
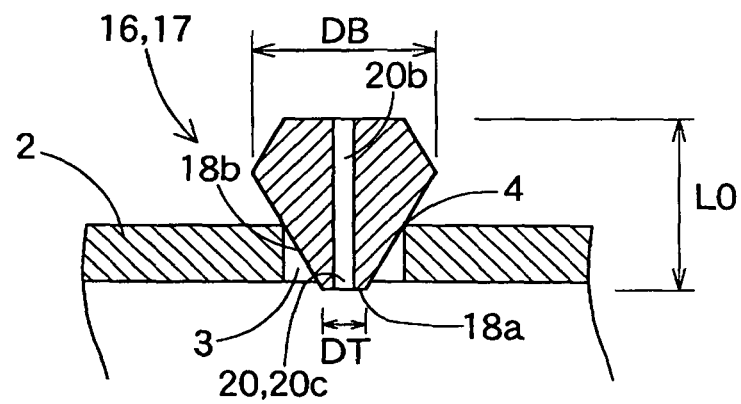

Further, as shown in FIG. 3A, the blocking body 16 in the state of the plug material 17 prior to its welding to the housing 2 has a filling channel 20 formed therein. The filling channel 20 penetrates from an end face 18a exposed to the opening 3 side of the proximal side end portion 18 to an end face 19a of the distal end portion 19, so as to fill the pressurized gas G into the housing 2. This filling channel 20 is blocked by a welding-blocked portion 24 which is formed as its inner peripheral surface 20a side is welded (fusion-solidified) by resistance-welding after the filling of the pressurized gas G into the housing 2 (see FIGS. 2 and 4B). In the filling channel 20, an outlet port 20c which is open in the end face 18a of the proximal side end portion 18 is formed with a smaller opening area than that of the opening 3 prior to blocking. It should be noted that, in the case of the first embodiment, the filling channel 20 in its state prior to the formation of the welding-blocked portion 24 has an identical circular opening shape throughout in the entire region from an inlet port 20b, which is open in the end face 19a of the distal end portion 19, to the outlet port 20c in the end face 18a of the proximal side end portion 18.

In addition, in the blocking body 16 (plug material 17), the periphery of the inlet port 20b in the distal end portion 19 at the time of filling the pressurized gas G serves as a nozzle receiving seat 21 for abutment of a filling nozzle 30 which is used at the time of the filling of the pressurized gas G. In the case of the first embodiment, this nozzle receiving seat 21 is formed as a tapered surface which is inclined such that its diameter is enlarged in the shape of a truncated cone toward the proximal side end portion 18 side as the portion of an outer peripheral surface 19b in the vicinity of the end face 19a of the distal end portion 19. Further, this nozzle receiving seat 21 is constructed so as to be inclined in correspondence with a distal-end inner peripheral edge (peripheral edge portion) 30b of the filling nozzle 30, such that, when the filling nozzle 30 is pressed against the housing 2 side along the axial direction CD of the opening 3, the nozzle receiving seat 21 is brought into pressure contact with the tapered peripheral edge portion 30b around an opening 30a of the filling nozzle 30 in such a way as to allow the interior of the filling channel 20 and the interior of the opening 30a to communicate with each other while ensuring gas tightness (sealability) therebetween.

Furthermore, in the blocking body 16 (plug material 17) in accordance with the first embodiment, the proximal side end portion 18 has an outer peripheral surface 18b of a gradually narrowed shape (tapered shape in the illustrated example) whose outer shape is formed in the shape of a truncated cone and which allows the end face 18a side to be inserted into the inner peripheral side of the opening 3, and which, when the filling nozzle 30 is pressed against the nozzle receiving seat 21 side, comes into pressure contact with the entire circumference of the peripheral edge 4 of the opening 3 while ensuring gas tightness. Namely, the setting is provided such that an outside diameter DT of a portion 18ba of the outer peripheral surface 18b on the end face 18a side is smaller than an inside diameter HD of the opening 3, and an outside diameter DB of a portion 18bb of the outer peripheral surface 18b on the distal end portion 19 side is greater than the inside diameter HD of the opening 3 (see FIGS. 3A and 3B).

Figure 3C:
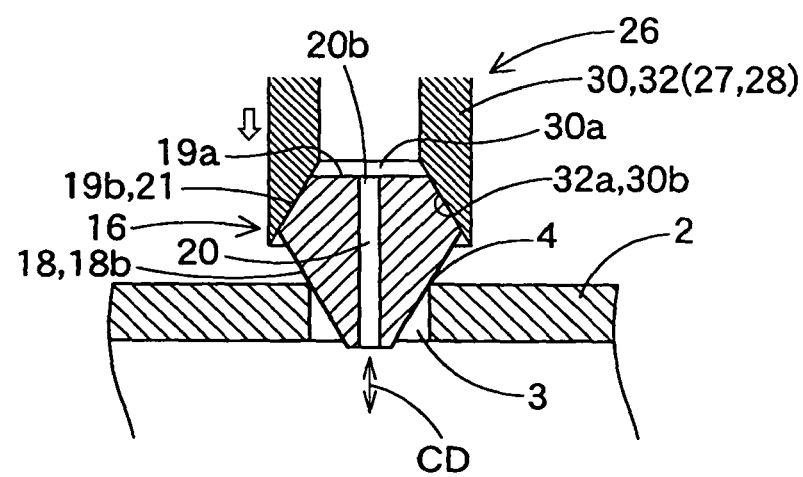
Figure 4A:
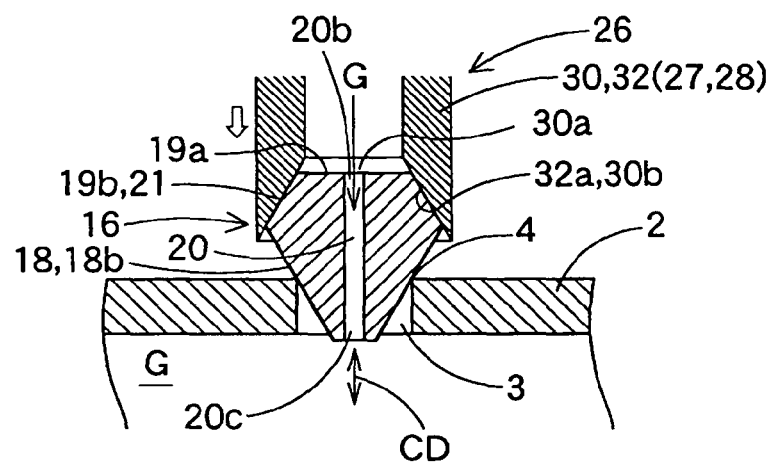
FIGS. 4A and 4B are diagrams explaining steps of manufacturing the inflator in accordance with the first embodiment, and illustrate steps subsequent to FIG. 3C.
Figure 4B:
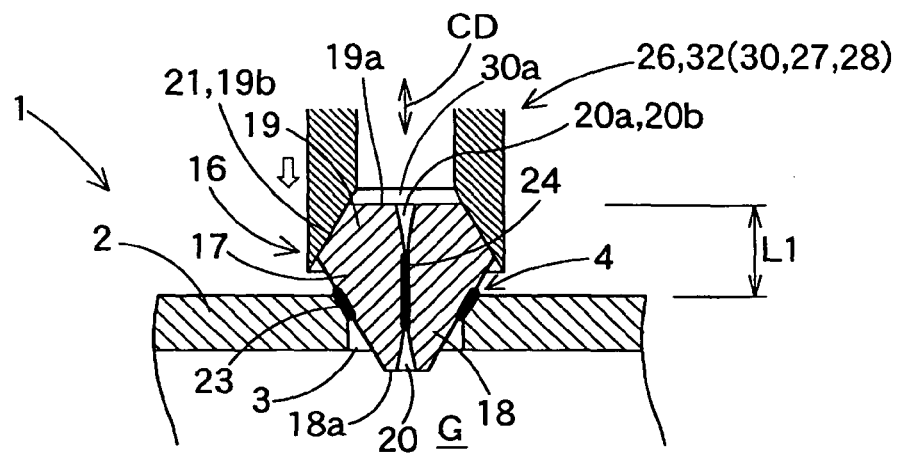

As shown in FIG. 3C and FIGS. 4A and 4B, a filling device 26 for filling the pressurized gas G which is used at the time of the manufacture of the inflator 1 is constructed by including a peripheral-edge welding electrode 27 for resistance-welding the blocking body 16 (plug material 17) to the peripheral edge 4 of the ff 3 of the housing 2, a channel blocking electrode 28 for welding and blocking the inner peripheral surface 20a side of the filling channel 20 by resistance-welding, and the filling nozzle 30 which is brought into pressure contact with the nozzle receiving seat 21 to cause the pressurized gas G supplied from an unillustrated pressurized gas source to flow into the filling channel 20. In the case of the first embodiment, the peripheral-edge welding electrode 27, the channel blocking electrode 28, and the filling nozzle 30 are formed as an integrated general-purpose electrode nozzle 32 so as to be used for these purposes. This general-purpose electrode nozzle 32 has the tapered distal end face 32*a* formed so as to be fitted to the outer peripheral surface 19*b* in the vicinity of the end face 19*a* of the distal end portion 19, as described above, when a distal end face 32*a* (peripheral edge portion 30*b*) is pressed against the outer peripheral surface 19*b* side of the distal end portion 19 of the blocking body 16.

It should be noted that the plug material 17 in accordance with the first embodiment is formed into the shape of a bead of an abacus (substantially barrel shape) as the outer peripheral surface 19*b* of the distal end portion 19 is formed into a tapered shape so as to expand toward the proximal side end portion 18 side and is made to continue to the portion 18*bb* of the tapered outer peripheral surface 18*b* of the proximal side end portion 18. The construction provided is such that the axial length L0 (see FIG. 3B) is made as practically short as possible while securing the outside diameter DB blocks the opening 3, so that the length L1 (see FIG. 4B) by which the blocking body 16 blocking the opening 3 of the housing 2 projects from the outer peripheral wall 2*a* of the housing 2 can be made short.

Next, a description will be given of the method of manufacturing the inflator 1 in accordance with this first embodiment. In the first embodiment, the inflator 1 is manufactured through a housing preparing step, a blocking body preparing step, a blocking body setting step, a blocking body abutment step, a filling nozzle disposing step, a pressurized gas filling step, a filling channel blocking step, and a blocking body fixing step.

The housing preparing step is a step for preparing the housing 2 having the opening 3 for filling the pressurized gas G for supplying to the air bag as an inflation gas. In the housing preparing step in the case of the first embodiment, the metal pipe for constituting the housing 2 is provided with the opening 3 by drilling to form the housing 2. Further, the discharge-side mouth portion 7 and the squib-side mouth portion 9 respectively provided with the rupture plates 13 and 14 are attached to the housing 2. It should be noted that the squib 10 and the gas generating agent 11 may be assembled to the interior of the squib-side mouth portion 9 not before the setting of the housing 2 to the filling device 26 but separately after the filling of the pressurized gas G.

The blocking body preparing step is a step for preparing the blocking body 16 (plug material 17) which blocks the opening 3 and through which the filling channel 20 filling the pressurized gas G into the housing 2 is provided. In the blocking body preparing step in the first embodiment, the external shape of the plug material 17 is formed by subjecting a predetermined metallic block to metal working, and the drilling of the filling channel is effected, thereby forming the plug material 17.

The blocking body setting step is a step after undergoing the housing preparing step and the blocking body preparing step. The blocking body setting step is a step in which, as shown in FIGS. 3A an 3B, the blocking body 16 (plug material 17) is disposed in the opening 3 such that the outlet port 20*c* of the filling channel 20 for the pressurized gas G is oriented toward the inner side of the housing 2, while the inlet port 20*b* of the filling channel 20 for the pressurized gas G is oriented toward the outer side of the housing 2, so that the interior and the exterior of the housing 2 are communicated with each other through the filling channel 20. Further, in the blocking body setting step in the first embodiment, the blocking body 16 is disposed in the opening 3 such that the outer peripheral surface 18*b* of the proximal side end portion 18 is brought into contact with the peripheral edge 4 of the opening 3 by inserting the end face 18*a* side of the proximal side end portion 18 into the opening 3 of the housing 2.

The blocking body abutment step is a step after undergoing the blocking body setting step, and is a step in which, as shown in FIG. 3C, the blocking body 16 is abutted against the peripheral edge 4 of the opening 3 so as to ensure sealability between the blocking body 16 and the peripheral edge 4 of the opening 3. In the first step, this blocking body abutment step is performed simultaneously with the filling nozzle disposing step.

The filling nozzle disposing step is a step in which, as shown in FIG. 3C, the filling nozzle 30 injecting the pressurized gas G is pressed against the nozzle receiving seat 21 in the periphery of the inlet port 20*b* of the blocking body 16 so as to ensure the sealability. In the filling nozzle disposing step in the first embodiment, the distal end face 32*a* (peripheral edge portion 30*b* of the filling nozzle 30) is pressed against the nozzle receiving seat 21 of the blocking body 16 so as to allow the inlet port 20*b* of the filling channel 20 and the opening 30*a* of the general-purpose electrode nozzle 32 (filling nozzle 30) to communicate with each other, thereby ensuring the gas tightness between the distal end face 32*a* of the general-purpose electrode nozzle 32 and the nozzle receiving seat 21.

At this time, in the first embodiment, the gas tightness between the proximal side end portion 18 of the plug material 17 (blocking body 16) and the peripheral edge 4 of the opening 3 is concurrently ensured by the pressing force of the blocking body 16 against the peripheral edge 4 of the opening 3 at the time of the pressing of the general-purpose electrode nozzle (filling nozzle 30) 32 against the nozzle receiving seat 21. Thus, the filling nozzle disposing step is performed simultaneously with the blocking body abutment step.

The pressurized gas filling step is a step after undergoing the filling nozzle disposing step, and is a step in which, as shown in FIG. 4A, the pressurized gas G is injected from the filling nozzle 30 to fill the pressurized gas G into the housing 2 through the filling channel 20. In the pressurized gas filling step in the first embodiment, a valve or the like on the unillustrated pressurized gas source is opened to inject the pressurized gas G from the opening 30*a* of the filling nozzle 30. The injected pressurized gas G flows into the filling channel 20 through the inlet port 20*b*, flows out from the outlet port 20*c* of the filling channel 20, and is filled into the housing 2. The pressurized gas G is filled until the pressure within the housing 2 reaches a predetermined pressure value in the range of 35 to 70 MPa.

The filling channel blocking step is a step after undergoing the pressurized gas filling step, and is a step in which, as shown in FIG. 4B, the blocking body 16 (plug material 17) is energized with a resistance-welding current so as to block the filling channel 20 by fusion-solidifying the inner peripheral surface 20*a* of the filling channel 20, to thereby resistance-weld the inner peripheral portion of the filling channel 20. The filling channel blocking step in the first embodiment is performed simultaneously with the blocking body fixing step for fixing the blocking body 16 to the peripheral edge 4 of the opening 3 so as to allow the sealability to the maintained. After completion of the filling of the pressurized gas G into the housing 2, the general-purpose electrode nozzle 32 is further brought into pressure contact with the nozzle receiving seat 21, and the general-purpose electrode nozzle 32 is energized with a resistance-welding current while the blocking body 16 is being pressed strongly against the peripheral edge 4 of the opening 3. Then, as shown in FIG. 4B, as the blocking body 16 is pressed strongly against the peripheral edge 4 of the opening 3, the inner peripheral surface 20a of the filling channel 20 in the vicinity of the peripheral edge 4 of the opening 3 is deformed so as to undergo reduction in its diameter, and is fusion-solidified so that the inner peripheral surface 20a of the filling channel 20 welds opposing portions of the peripheral wall, to thereby forming the welding-blocked portion 24 and block the filling channel 20.

At the same time, in the first embodiment, the outer peripheral surface 18b of the proximal side end portion 18 and the peripheral edge 4 of the opening 3 are also resistance-welded, so that the blocking body 16 forms a peripheral edge welded portion 23 and is welded to the peripheral edge 4 so as to block the opening 3. Thus, the blocking body fixing step is also completed in which the blocking body 16 is fixed to the peripheral edge 4 of the opening 3 while making it possible to maintain the sealability.

Subsequently, in the first embodiment, the supply of the pressurized gas G from the pressurized gas source to the opening 30a side of the general-purpose electrode nozzle 32 is stopped, the general-purpose electrode nozzle 32 is moved away from the blocking body 16, and the housing 2 is removed from the filling device 26. It is thereby possible to obtain the inflator 1 manufactured by filling the pressurized gas G into the housing 2.

In the first embodiment, the fixing step (blocking body fixing step) in the state in which the sealability between the blocking body 16 and the peripheral edge 4 of the opening 3 of the housing 2 is maintained is performed after the blocking body abutment step, specifically, simultaneously with the filling channel blocking step after the pressurized gas filling step. In the pressurized gas filling step, since the sealability between the blocking body 16 and the peripheral edge 4 of the opening 3 has already been ensured in the blocking body abutment step (FIG. 3C), after the filling nozzle disposing step of pressing the filling nozzle 30 against the nozzle receiving seat 21 of the blocking body 16 in the periphery of the inlet port 20b, if the pressurized gas G is injected from the filling nozzle 30, the pressurized gas G is filled into the housing 2 through the filling channel 20 without gas leakage, and the pressurized gas filling step can be completed smoothly. Further, after the pressurized gas filling step, if the state of the filling nozzle disposing step is maintained for pressing the filling nozzle 30 against the nozzle receiving seat 21 of the blocking body 16 in the periphery of the inlet port 20b while maintaining the sealability, it is possible to maintain the state in which the leakage of the pressurized gas from the housing 2 and the blocking body 16 is absent, due also to the fact that the sealability between the blocking body 16 itself and the peripheral edge 4 of the opening 3 has already been ensured in the blocking body abutment step. For this reason, in the fixing step at the time of performing the blocking body fixing step for fixing the blocking body 16 to the housing 2 after the pressurized gas filling step, fixing portions of the blocking body 16 and the peripheral edge 4 of the opening 3 can be kept exposed to the atmosphere.

Namely, in the first embodiment, in the blocking body fixing step, the fixing portions of the blocking body 16 and the peripheral edge 4 of the opening 3 can be fixed by the fixing operation such as resistance-welding in the atmospheric environment (under normal pressure) in which they are exposed to the atmosphere. Further, as the filling device 26 having the filling nozzle 30 and the electrodes (the peripheral-edge welding electrode 27 and the channel blocking electrode 28) at the time of filling the pressurized gas G, by merely securing a structure whereby the filling nozzle 30 is pressed against the nozzle receiving seat 21 of the blocking body 16 in the periphery of the inlet port 20b of filling channel 20 so as to provide a seal, it is possible to provide a simplified structure without needing to provide a conventional large cover for surrounding the peripheral edge of the opening while ensuring sealability.

Accordingly, in the first embodiment, the inflator 1 can be manufactured easily at low cost by using the filling device 26 having the simplified structure.

Furthermore, in the first embodiment, the blocking body abutment step is provided as a step of ensuring sealability between the blocking body 16 and the peripheral edge 4 of the opening 3 by pressing the blocking body 16 against the peripheral edge 4 of the opening 3 while in abutment therewith, as shown in FIG. 3C, and the blocking body fixing step is performed after the blocking body abutment step, as shown in FIG. 4B. Namely, if the blocking body abutment step in the case where the blocking body fixing step is performed after the blocking body abutment step is provided as a step of ensuring sealability between the blocking body 16 and the peripheral edge 4 of the opening 3 by pressing the blocking body 16 against the peripheral edge 4 of the opening 3 while in abutment therewith as in this first embodiment, the blocking body abutment step can be easily completed merely by the pressing operation of pressing the blocking body 16 against the peripheral edge 4 side of the opening 3.

It should be noted that in the case where the sealability is ensured between the blocking body 16 and the peripheral edge 4 of the opening 3 by pressing the blocking body 16 against the peripheral edge 4 of the opening 3 while in abutment therewith, it is possible to use, for instance, such a clamp, a pressing plunger, or the like as to press the plug material 17 against the peripheral edge 4 side of the opening 3 as a pressing member, apart from using the filling nozzle 30. By way of example, in the case where a simple clamp is used, the portion to be clamped on the plug material 17 side is a pressing portion pressing against the housing 2 side, i.e., a vicinity of an outer edge 19c (see FIG. 2) of the outer peripheral surface 19b, while the portion to be clamped on the housing 2 side is an outer peripheral surface portion 2b (see FIG. 1) on the opposite side to the opening 3. In the case where the blocking body fixing step is performed after the blocking body abutment step, the blocking body abutment step itself may be performed by using a clamp for clamping these both portions. It should be noted that the filling nozzle 30 at this time suffices if it is constructed with its outside diameter reduced so that the filling nozzle 30 will not interfere with the clamp.

However, in the first embodiment, the filling nozzle 30 itself is used as a pressing member for pressing the blocking body 16 against the peripheral edge 4 side of the opening 3 by performing the blocking body abutment step simultaneously with the pressing against the blocking body 16 of the filling nozzle 30 which is used in the filling nozzle disposing step. For this reason, in the first embodiment, a pressing member for pressing the blocking body 16 may not be separately provided in the blocking body abutment step, so that the inflator 1 can be manufactured while reducing the number of equipment used.

In particular, in the first embodiment, the end portion (proximal side end portion) 18 of the blocking body 16 on the outlet port 20c side of the filling channel 20 is formed into a tapered shape so as to be inserted into the inner peripheral side of the opening 3 and to allow its outer peripheral surface 18b to be brought into pressure contact with the entire circumference of the peripheral edge 4 of the opening 3 while ensuring sealability at the time of pressing in the inserting direction. For this reason, at the time of the pressing of the filling nozzle 30 against the blocking body 16 in the filling nozzle disposing step, the blocking body 16 can be pushed into the opening 3, and the blocking body 16 can be brought into pressure contact with the peripheral edge 4 of the opening 3 while ensuring sealability.

In addition, in the first embodiment, the blocking body fixing step is provided as a step for fixing the blocking body 16 to the peripheral edge 4 of the opening 3 by resistance-welding. For this reason, a resistance-welding power supply or the like which is used for resistance-welding at the time of blocking the filling channel 20 can be used for joint purposes. As compared with a case where other fixing means for such as welding including arc welding are used, it is possible to reduce the number of equipment used, so that the inflator 1 can be manufactured more easily and at lower cost. It should be noted that if this aspect is not taken into consideration, welding other than resistance-welding, such as arc welding, may be used to fix (secure) the blocking body 16 (plug material 17) to the peripheral edge 4 of the opening 3.

It goes without saying that if, as in the first embodiment, the blocking body fixing step is provided as a step for fixing the blocking body 16 to the peripheral edge 4 of the opening 3 by resistance-welding, the blocking body fixing step can be performed simultaneously with the filling channel blocking step by making use of the resistance-welding electrodes (the peripheral-edge welding electrode 27 and the channel blocking electrode 28) themselves which are used in resistance-welding at the time of blocking the filling channel 20. In that case, the inflator 1 can be manufactured while further reducing the number of equipment used.

In addition, in the first embodiment, as the filling nozzle 30 also serves as the electrode (channel blocking electrode) 28 for resistance-welding which is used in the filling channel blocking step, the general-purpose electrode nozzle 32 used in the pressurized gas filling step can be pressed against the nozzle receiving seat 21 of the blocking body 16 in the periphery of the inlet port 20b of the filling channel 20. Thus, the operation can proceed automatically and speedily to the filling channel blocking step in the state in which the sealability of the periphery of the inlet port 20b has been ensured, and the filling channel blocking step can be completed automatically and speedily.

In particular, in the first embodiment, the filling nozzle 30 is used jointly as the peripheral-edge welding electrode 27, the channel blocking electrode 28, and the pressing member for pressing the blocking body 16 in the blocking body abutment step. Hence, the inflator 1 can be manufactured while further reducing the number of equipment used, and the operation can proceed speedily and smoothly to the blocking body abutment step, the filling nozzle disposing step, the pressurized gas filling step, the filling channel blocking step, and the blocking body fixing step.

Figure 5:
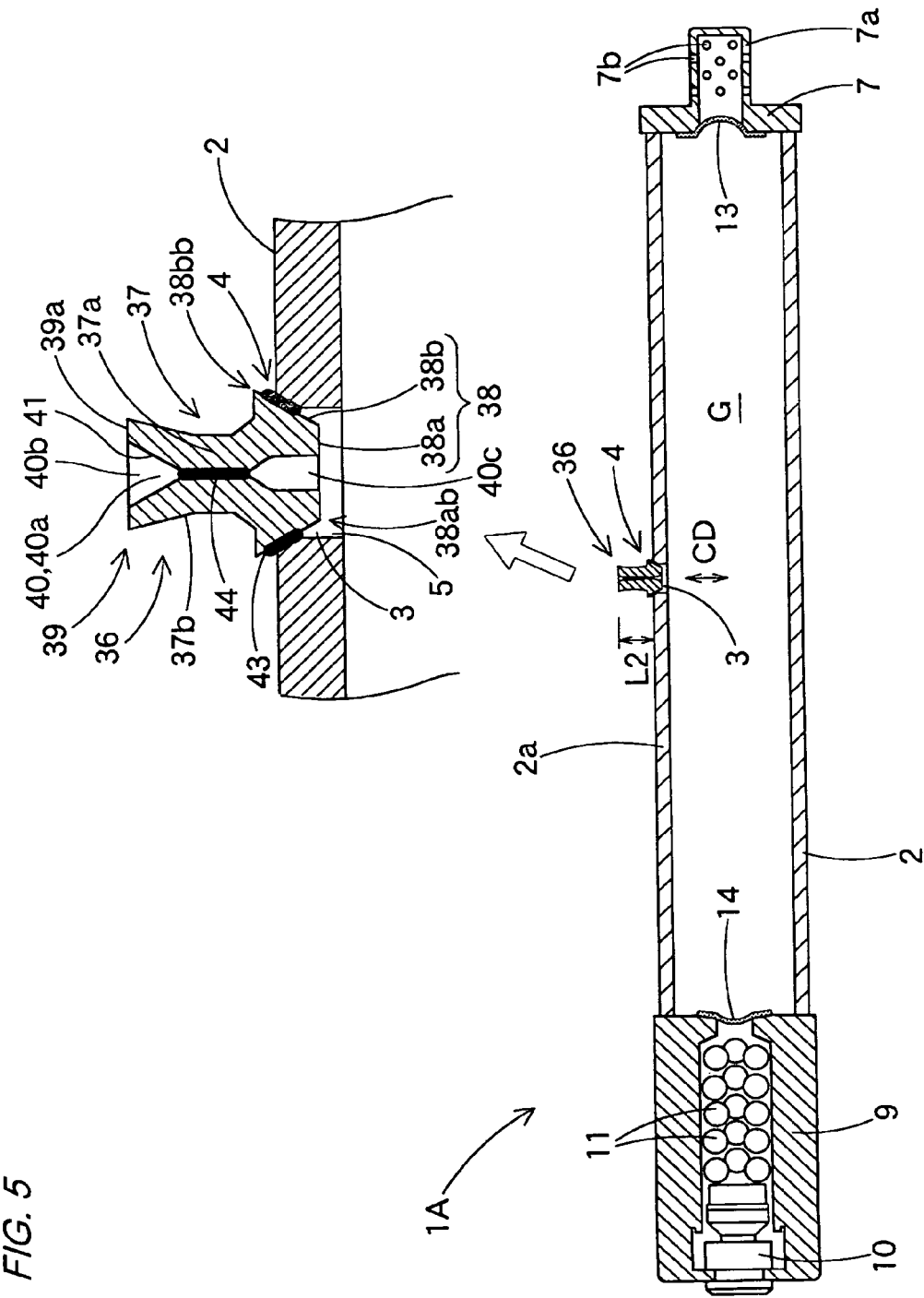
FIG. 5 is a cross-sectional view illustrating an inflator in accordance with a second embodiment.

It should be noted that, in the first embodiment, the gas tightness (sealability) between the proximal side end portion 18 of the blocking body 16 and the peripheral edge 4 of the opening 3 in the blocking body abutment step is ensured by the pressing force of the blocking body 16 against the peripheral edge 4 of the opening 3 during the pressing of the filling nozzle 30 against the nozzle receiving seat 21 during filling. However, an arrangement may be provided such that, as in the method of manufacturing an inflator 1A in accordance with a second embodiment shown in FIG. 5, the blocking body abutment step and the blocking body fixing step may be performed simultaneously so as to be able to ensure the sealability between the both portions while maintaining durability. Incidentally, the blocking body fixing step in the second embodiment is performed by a fixing operation in which a blocking body 36 is resistance-welded to the peripheral edge 4 of the opening 3.

In the inflator 1A which is manufactured in this second embodiment, only the construction of the blocking body 36 differs from that of the blocking body 16 of the inflator 1 in accordance with the first embodiment, and the construction of the other housing 2 side is similar to that of the first embodiment. Those members and portions which are identical to those of the first embodiment will be denoted by the same reference numerals, and a description thereof will be omitted.

Figure 6B:
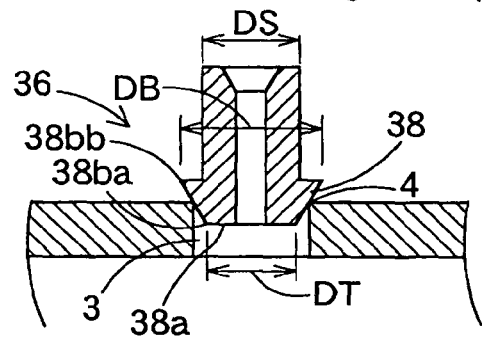
Figure 7A:
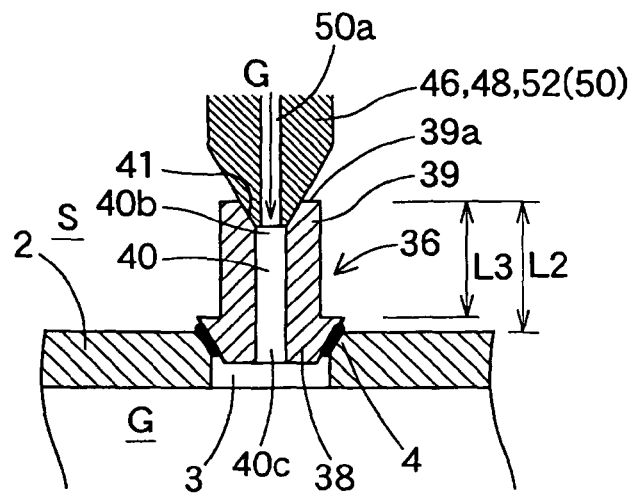
FIGS. 7A to 7C are diagrams explaining steps of manufacturing the inflator in accordance with the second embodiment, and illustrate steps subsequent to FIG. 6D.

The blocking body 36 in accordance with the second embodiment is formed of a resistance-weldable metallic material such as low carbon steel in the same way as the blocking body 16 in accordance with the first embodiment, and is welded to the peripheral edge 4 of the opening 3 of the housing 2 by resistance-welding. The blocking body 36 is formed of a plug material 37 which extends along the axial direction CD of the opening 3 such that its proximal side end portion 38 at a welded peripheral portion 43 is welded to the peripheral edge 4 of the opening 3, and its distal end portion 39 projects from the peripheral edge 4 of the opening 3. It should be noted that, in the plug material 37 of the blocking body 36 in accordance with the second embodiment, an intermediate portion 37a ranging from the proximal side end portion 38 to an end face 39a on the distal end portion 39 side has a smaller outside diameter DS (see FIG. 6BH) than the proximal side end portion 38, and is formed in an elongated cylindrical shape. Further, the length L3 of the intermediate portion 37a up to the end face 39a extends from the proximal side end portion 38, as shown in FIG. 7A, such that the blocking body 36 projects from the peripheral edge 4 of the opening 3 of the housing 2 with a length L2 so as to secure a space (welding operation space) S (see FIGS. 7B and 7C) for allowing an outer peripheral surface 37b to be clamped by a pair of channel blocking electrodes 48 for resistance-welding to form a welding-blocked portion 44.

Figure 6A:
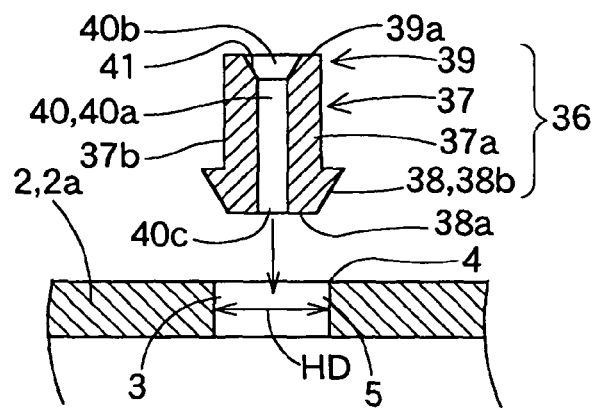
FIGS. 6A to 6D are diagrams explaining steps of manufacturing the inflator in accordance with the second embodiment.

In addition, as shown in FIG. 6A, the blocking body 36 (plug material 17) in the state prior to its welding to the housing 2 also has a filling channel 40 formed therein. The filling channel 40 penetrates from an end face 38a exposed to the opening 3 side of the proximal side end portion 18 to the end face 39a of the distal end portion 39, so as to fill the pressurized gas G into the housing 2. This filling channel 40 is also blocked by a welding-blocked portion 44 which is formed as its inner peripheral surface 40a side is welded (fusion-solidified) by resistance-welding after the filling of the pressurized gas G into the housing 2 in the same way as in the first embodiment (see FIG. 7C). In the filling channel 40, an outlet port 40c which is open in the end face 38a of the proximal side end portion 38 is formed with a smaller opening area than that of the opening 3 prior to blocking in the same way as in the first embodiment. Furthermore, the filling channel 40 has an identical circular opening shape throughout in the entire region from an inlet port 40b, which is open in the end face 39a of the distal end portion 39, to the outlet port 40c in the proximal side end portion 38.

In addition, in the blocking body 36, the periphery of the inlet port 40b on the end face 39a side of the distal end portion 39 of the plug material 37 at the time of filling the pressurized gas G serves as a tapered surface-shaped nozzle receiving seat 41 for abutment of a filling nozzle 50 which is used at the time of the filling of the pressurized gas G. Further, in the same way as in the first embodiment, this nozzle receiving seat 41 is constructed in a tapered shape in correspondence with a distal-end outer peripheral edge (peripheral edge portion) 50b of the filling nozzle 50, such that, when the filling nozzle 50 is pressed against the housing 2 side along the axial direction CD of the opening 3, the nozzle receiving seat 41 is brought into pressure contact with the tapered peripheral edge portion 50b at a peripheral edge of an opening 50a of the filling nozzle 50 in such a way as to allow the interior of the filling channel 40 and the interior of the opening 50a to communicate with each other while ensuring gas tightness therebetween.

Furthermore, also in the blocking body 36 in accordance with the second embodiment, the proximal side end portion 38 of the plug material 37 has an outer peripheral surface 38b of a gradually narrowed shape (tapered shape in the illustrated example) which allows the end face 38a side to be inserted into the inner peripheral side of the opening 3, and which, when the distal end portion 39 is pressed by a peripheral-edge welding electrode 47 toward the housing 2 side, come into pressure contact with the entire circumference of the peripheral edge 4 of the opening 3 while ensuring gas tightness. Namely, in the same way as in the first embodiment, the setting is provided such that the outside diameter DT of a portion 38ba of the outer peripheral surface 38b on the end face 38a side is smaller than the inside diameter HD of the opening 3, and the outside diameter DB of a portion 38bb of the outer peripheral surface 38b on the distal end portion 39 side is greater than the inside diameter HD of the opening 3 (see FIGS. 6A and 3B).

Figure 6C:
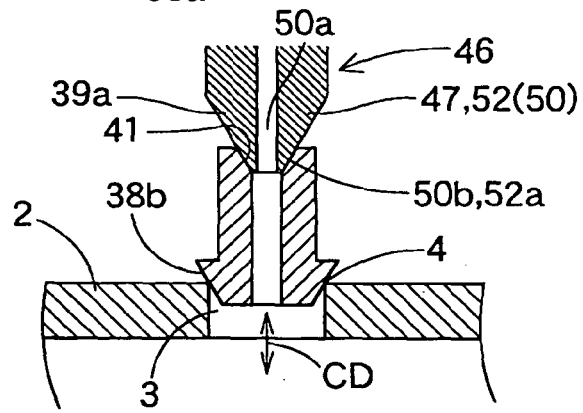
Figure 7B:
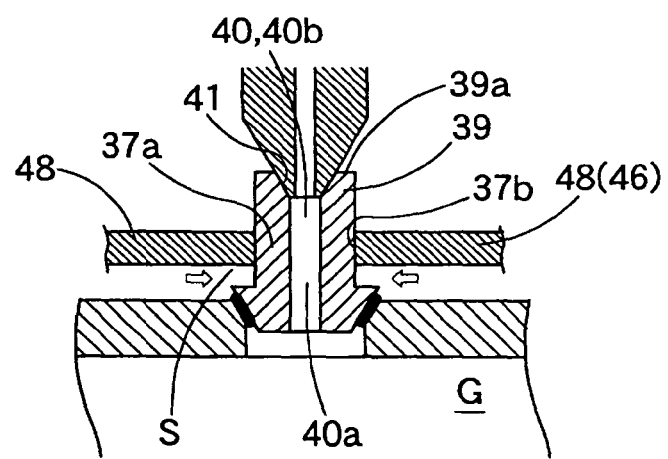

As shown in FIG. 6C and FIG. 7B, a filling device 46 for filling the pressurized gas G which is used at the time of the manufacture of the inflator 1 is constructed by including the peripheral-edge welding electrode 47 for resistance-welding the blocking body 36 to the peripheral edge 4 of the ff 3 of the housing 2, the pair of channel blocking electrodes 48 for welding and blocking the inner peripheral surface 40a side of the filling channel 40 by resistance-welding, and the filling nozzle 50 which is brought into pressure contact with the nozzle receiving seat 41 to cause the pressurized gas G supplied from an unillustrated pressurized gas source to flow into the filling channel 40. In the case of the first embodiment, the peripheral-edge welding electrode 47 and the filling nozzle 50 are formed as an integrated general-purpose electrode nozzle 52 so as to be used for these purposes. In addition, the pair of channel blocking electrodes 48 are disposed so as to clamp the intermediate portion 37a from directions perpendicular to its axis.

A description will be given of the method of manufacturing the inflator 1A in accordance with this second embodiment. In the second embodiment, the inflator 1A is manufactured through the housing preparing step, the blocking body preparing step, the blocking body setting step, the blocking body abutment step, the filling nozzle disposing step, the pressurized gas filling step, the filling channel blocking step, and the blocking body fixing step. As described above, the blocking body fixing step is performed simultaneously with the blocking body abutment step.

In the same way as in the first embodiment, in the housing preparing step, the metal pipe for constituting the housing 2 is provided with the opening 3 by drilling to form the housing 2. Further, the discharge-side mouth portion 7 and the squib-side mouth portion 9 respectively provided with the rupture plates 13 and 14 are attached to the housing 2.

The blocking body preparing step is a step for preparing the blocking body 36 (plug material 37) which blocks the opening 3 and through which the filling channel 40 filling the pressurized gas G into the housing 2 is provided. In the blocking body preparing step in the second embodiment as well, the external shape of the plug material 37 is formed by subjecting a predetermined metallic block to metal working, and the drilling of the filling channel is effected, thereby forming the plug material 37.

After undergoing the housing preparing step and the blocking body preparing step, the operation proceeds to the blocking body setting step. In the blocking body setting step, as shown in FIGS. 6A and 6B, the blocking body 36 is disposed in the opening 3 such that the outer peripheral surface 38b of the proximal side end portion 38 is brought into contact with the peripheral edge 4 of the opening 3 by inserting the end face 38a side of the proximal side end portion 38 into the opening 3 of the housing 2.

Figure 6D:
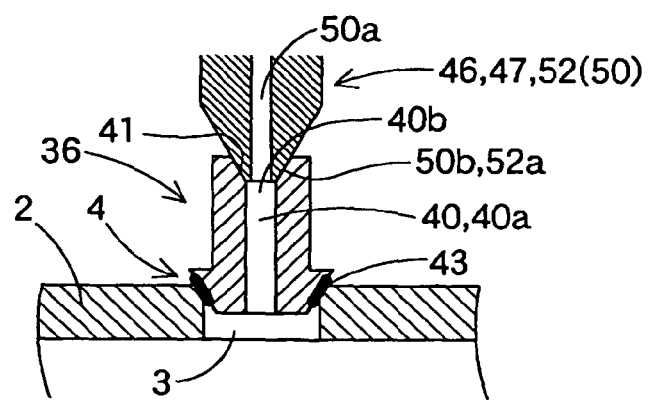

After undergoing the blocking body setting step, the operation proceeds to the blocking body abutment step. In the blocking body abutment step in the second embodiment, as shown in FIGS. 6C and 6D, the general-purpose electrode nozzle (peripheral-edge welding electrode 47) 52 is pressed against the nozzle receiving seat 41 of the leading end portion 39 of the blocking body 36, the outer peripheral surface 38b of the proximal side end portion 38 of the blocking body 36 is pressed against the entire circumference of the peripheral edge 4 of the opening 3 in abutment therewith, so as to ensure sealability between the outer peripheral surface 38b of the proximal side end portion 38 of the blocking body 36 and the peripheral edge 4 of the opening 3. Subsequently, the peripheral-edge welding electrode 47 is energized with a resistance-welding current for a predetermined time. The outer peripheral surface 38b of the proximal side end portion 38 and the peripheral edge 4 of the opening 3 are then resistance-welded, so that the welded peripheral portion 43 is formed on the blocking body 36 and is welded to the peripheral edge 4 so as to block the opening 3 so as to maintain sealability. Thus, the blocking body fixing step is also completed.

At this time, the general-purpose electrode nozzle (filling nozzle 50) 52 has its distal end outer peripheral surface 52a (peripheral edge portion 50b of the filling nozzle 50) already pressed against the nozzle receiving seat 41 of the blocking body 36 so as to allow the inlet port 40b of the filling channel 40 and the opening 50a of the general-purpose electrode nozzle 52 (peripheral-edge welding electrode 47) to communicate with each other, thereby ensuring gas tightness between the peripheral edge portion 50b of the filling nozzle 50 and the nozzle receiving seat 41. Thus, in the second embodiment, the filling nozzle disposing step is already performed simultaneously with the blocking body abutment step and the blocking body fixing step.

Then, the operation can proceed to the subsequent pressurized gas filling step promptly after the filling nozzle disposing step. In the pressurized gas filling step, as shown in FIG. 7A, the valve or the like on the unillustrated pressurized gas source side is opened to allow the pressurized gas G to flow in from the opening 50a. Then, the pressurized gas G is filled into the housing 2 through the filling channel 40.

Figure 7C:
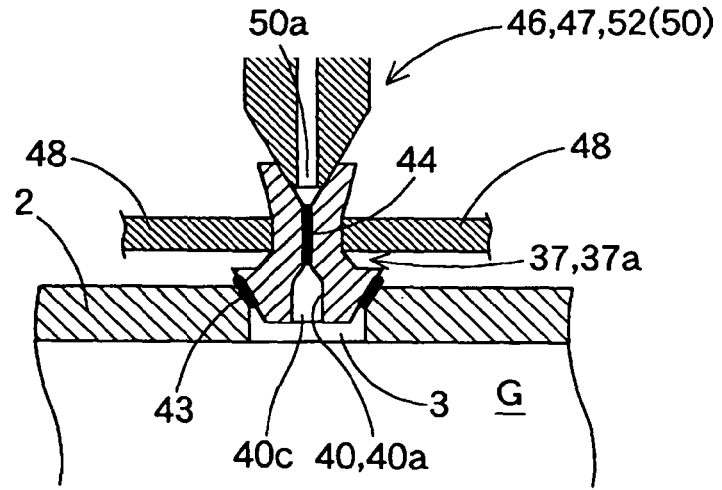

When the filling of the pressurized gas G into the housing 2 is completed in the pressurized gas filling step, the operation proceeds to the filling channel blocking step. In the filling channel blocking step in the second embodiment, as shown in FIGS. 7B and 7C, the pair of channel blocking electrodes 48 are made to approach each other to clamp the intermediate portion 37a of the blocking body 36, and are energized with a resistance-welding current for a predetermined time while causing the inner peripheral surface 40a of the filling channel 40 to be deformed so as to undergo reduction in diameter. Then, on the inner peripheral surface 40a side of the filling channel 40, the inner peripheral surface 40a itself is fusion-solidified so as to weld its peripheral wall portions, thereby forming the welding-blocked portion 44 and blocking the filling channel 40.

Subsequently, the supply of the pressurized gas G from the pressurized gas source to the opening 50a side of the general-purpose electrode nozzle 52 is stopped, the general-purpose electrode nozzle 52 and the pair of channel blocking electrodes 48 are moved away from the blocking body 36, and the housing 2 is removed from the filling device 46. It is thereby possible to obtain the inflator 1A manufactured by filling the pressurized gas G into the housing 2.

In the method of manufacturing the inflator 1A in accordance with this second embodiment, the fixing step (blocking body fixing step) in the state in which the sealability between the blocking body 36 and the peripheral edge 4 of the opening 3 of the housing 2 is maintained is performed simultaneously with the blocking body abutment step, as shown in FIGS. 6C and 6D. Namely, in the second embodiment, the blocking body fixing step is performed simultaneously with the blocking body abutment step. In the blocking body abutment step, which is a step after undergoing the blocking body setting step, the blocking body 36 is abutted against the peripheral edge 4 of the opening 3 so as to ensure sealability between the blocking body 36 and the peripheral edge 4 of the opening 3. Additionally, concurrently at this time, the blocking body fixing step for fixing the blocking body 36 to the housing 2 is performed by the fixing operation based on resistance-welding. This fixing operation is an operation which is performed prior to the filling of the pressurized gas G, and can be performed in the atmospheric environment. Namely, the fixing portions of the outer peripheral surface 38b of the blocking body 36 and the peripheral edge 4 of the opening 3 can be fixed by the fixing operation based on resistance-welding in the atmospheric environment (under normal pressure) in which they are exposed to the atmosphere. For this reason, as the filling device 46 having the filling nozzle 50 and the electrodes (the peripheral-edge welding electrode 47 and the channel blocking electrodes 48) at the time of filling the pressurized gas G, by merely securing a structure whereby the filling nozzle 50 is pressed against the nozzle receiving seat 41 in the periphery of the inlet port 40b of the filling channel 40 in the blocking body 36 so as to provide a seal, it is possible to provide a simplified structure without needing to provide a conventional large cover for surrounding the peripheral edge of the opening while ensuring sealability.

Accordingly, in the second embodiment as well, the inflator 1A can be manufactured easily at low cost by using the filling device 46 having the simplified structure.

In addition, in the second embodiment, the blocking body fixing step is provided as a step for fixing the blocking body 36 to the peripheral edge 4 of the opening 3 by resistance-welding. Hence, a resistance-welding power supply or the like which is used for resistance-welding at the time of blocking the filling channel 40 can be used for joint purposes. As compared with a case where other fixing means for such as welding including arc welding are used, it is possible to reduce the number of equipment used, so that the inflator 1A can be manufactured more easily and at lower cost.

It goes without saying that if this aspect is not taken into consideration, the blocking body fixing step for fixing the blocking body 36 to the peripheral edge 4 of the opening 3 of the housing 2 may be performed by a fixing operation based on welding other than resistance-welding, such as arc welding or blazing, or based on threaded joint, press fitting such as interference fit, bonding, or the like, so as to be performed simultaneously with the blocking body abutment step subsequent to the blocking body setting step. In this case, the fixing portions of the outer peripheral surface 38b of the blocking body 36 and the peripheral edge 4 of the opening 3 are in the atmospheric environment (under normal pressure) in which they are exposed to the atmosphere, so that the blocking body 36 can be easily fixed (secured) to the peripheral edge of the opening 3. Further, in this case, it is possible to provide the following arrangement: A multiplicity of housings 2, for each of which the blocking body fixing step has been completed by securing the blocking body 36 by welding or the like, are prepared in advance prior to the filling of the pressurized gas G. The filling device 46 is constructed by being provided with the filling nozzle 50 merely for filling the pressurized gas G and the channel blocking electrodes 48. By using such a filling device 46, only the filling of the pressurized gas G and the formation of the welding-blocked portion 44 are performed to manufacture the inflators 1A.

Similarly, also in the inflator 1 in accordance with the first embodiment, the blocking body fixing step may be completed in advance prior to the filling of the pressurized gas G by securing the blocking body 16 to the peripheral edge 4 of the opening 3 by welding or the like. Further, by using the filling device 26 provided with the general-purpose electrode nozzle 32 in which the channel blocking electrode 28 and the filling nozzle 30 are integrally formed, the filling of the pressurized gas G into the housing 2 and the formation of the welding-blocked portion 24 may be performed to manufacture the inflators 1.

Further, in the second embodiment, the arrangement provided is such that when the filling nozzle 50 is brought into pressure contact with the nozzle receiving seat 41 in the periphery of the inlet port 40b of the blocking body 36, the filling nozzle 50 presses the blocking body 36 itself against the peripheral edge 4 of the opening 3 while in abutment therewith, so that the filling nozzle disposing step can be performed simultaneously with the blocking body abutment step. For this reason, in this case as well, even if a pressing member for pressing the blocking body 36 is not separately provided in the blocking body abutment step, the filling nozzle 50 can be made use of, so that the inflator 1A can be manufactured while reducing the number of equipment used.

Furthermore, in the second embodiment, the filling nozzle 50 is constructed as the general-purpose electrode nozzle 52 which also serves as the electrode (peripheral-edge welding electrode) 47 for resistance-welding which is used in the blocking body fixing step. For this reason, the blocking body 36 can be easily resistance-welded to the peripheral edge 4 of the opening 3 prior to the pressurized gas filling step, so that as compared with the case where the peripheral-edge welding electrode 47 is separately prepared, the number of equipment used can be reduced, thereby making it possible to manufacture the inflator 1A more easily and at lower cost.

It goes without saying that if this aspect is not taken into consideration, the peripheral-edge welding electrode 47 and the filling nozzle 50 may be formed as separate units instead of using the general-purpose electrode nozzle 52 in which the peripheral-edge welding electrode 47 and the filling nozzle 50 are integrally formed. Thus, the blocking body fixing step may be completed by fixing the blocking body 36 to the peripheral edge 4 of the opening 3 by welding or the like prior to the disposing of the filling nozzle 50 for the pressurized gas G.

It should be noted that, in the second embodiment as well, the end portion (proximal side end portion) 38 of the blocking body 36 on the outlet port 40c side of the filling channel 40 is formed into a tapered shape so as to be inserted into the inner peripheral side of the opening 3 and to allow its outer peripheral surface 38b to be brought into pressure contact with the entire circumference of the peripheral edge 4 of the opening 3 while ensuring sealability at the time of pressing in the inserting direction. For this reason, in such a construction, the blocking body 36 can be pressed into the opening 3 by pressing by the general-purpose electrode nozzle 52, so as to bring the blocking body 36 into pressure contact with the peripheral edge 4 of the opening 3. Hence, the outer peripheral surface 38*b* of the blocking body 36 and the peripheral edge 4 of the opening 3 can be easily resistance-welded to each other.

In addition, in this second embodiment, in the filling channel blocking step, as the distal end portion 39 side of the plug material 37 is energized by being clamped by the pair of channel blocking electrodes 48, the welding-blocked portion 44 is formed to thereby manufacture the inflator 1A. Further, in this second embodiment, the intermediate portion 37*a* on the distal end portion 39 side of the plug material 37 in the blocking body 36 ensures around the peripheral edge 4 of the opening 3 the length L2 so as to secure the welding operation space S for allowing the outer peripheral surface 37*b* to be clamped by the pair of channel blocking electrodes 48 for resistance-welding to form the welding-blocked portion 44.

For this reason, in this filling channel blocking step, in the second embodiment, by virtue of the welding operation space S, the pair of channel blocking electrodes 48 can be easily disposed at the outer peripheral surface 37*b* of the intermediate portion 37*a* on the distal end portion 39 side at a separate position remote from the nozzle receiving seat 41 in the periphery of the inlet port 40*b* serving as the portion to be pressed by the filling nozzle 50. Further, the pair of channel blocking electrodes 48 can be easily disposed at disposing positions where resistance-welding can be performed while maintaining the state in which the filling nozzle 50 is brought into pressure contact with the periphery of the inlet port 40*b*, i.e., the state in which the sealability at the periphery of the inlet port 40*b* is stably ensured, thereby making it possible to form the welding-blocked portion 44. As a result, coupled with the fact that the blocking body 36 is welded to the peripheral edge 4 of the opening 3 prior to the filling of the pressurized gas G, the pressurized gas G can be filled into the housing 2 while suppressing the leakage of the pressurized gas G as practically as possible, thereby making it possible to manufacture the inflator 1A.

In addition, although, with the inflators 1 and 1A in accordance with the first and second embodiments, a hybrid type has been illustrated, the present invention may be applied to an inflator of a stored type in which the supply of the inflation gas into the air bag is effected only by the pressurized gas.

What is claimed is:

1. A method of manufacturing an inflator in which a pressurized gas for supplying to an air bag as an inflation gas is filled into a housing, comprising:
    a housing preparing step in which the housing having an opening for filling the pressurized gas is provided;
    a blocking body preparing step in which a blocking body which blocks the opening and through which a filling channel filling the pressurized gas into the housing is provided;
    a blocking body setting step which is after the housing preparing step and the blocking body preparing step and in which the blocking body is disposed in the opening such that an outlet port of the filling channel for the pressurized gas is oriented toward an inner side of the housing, while an inlet port of the filling channel for the pressurized gas is oriented toward an outer side of the housing, so that an interior and an exterior of the housing are communicated with each other through the filling channel;
    a blocking body abutment step which is after the blocking body setting step and in which the blocking body is abutted against a peripheral edge of the opening so as to ensure scalability between the blocking body and the peripheral edge of the opening;
    a filling nozzle disposing step which is after or simultaneously with the blocking body abutment step and in which a filling nozzle injecting the pressurized gas is pressed against a periphery of the inlet port of the blocking body so as to ensure sealability;
    a pressurized gas filling step which is after the filling nozzle disposing step and in which the pressurized gas is injected from the filling nozzle to fill the pressurized gas into the housing through the filling channel;
    a filling channel blocking step which is after the pressurized gas filling step and in which the blocking body is energized with a resistance-welding current so as to block the filling channel by fusion-solidifying an inner peripheral surface of the filling channel, to thereby resistance-weld inner peripheral wall portions of the filling channel to each other; and
    a blocking body fixing step for fixing the blocking body to the peripheral edge of the opening so as to allow sealability to be maintained,
    wherein the blocking body fixing step is performed simultaneously with the blocking body abutment step or after the blocking body abutment step, and
    wherein the filling nozzle also serves as an electrode for resistance-welding which is used in the filling channel blocking step.

2. The method of manufacturing an inflator according to claim 1, wherein the blocking body abutment step is provided as a step of ensuring sealability between the blocking body and the peripheral edge of the opening by pressing the blocking body against the peripheral edge of the opening while in abutment therewith, and the blocking body fixing step is performed after the blocking body abutment step.

3. The method of manufacturing an inflator according to claim 1, wherein the blocking body fixing step is provided as a step for fixing the blocking body to the peripheral edge of the opening by resistance-welding.

4. The method of manufacturing an inflator according to claim 3, wherein the blocking body fixing step is performed simultaneously with the filling channel blocking step.

5. A method of manufacturing an inflator in which a pressurized gas for supplying to an air bag as an inflation gas is filled into a housing, comprising:
    a housing preparing step in which the housing having an opening for filling the pressurized gas is provided;
    a blocking body preparing step in which a blocking body which blocks the opening and through which a filling channel filling the pressurized gas into the housing is provided;
    a blocking body setting step which is after the housing preparing step and the blocking body preparing step and in which the blocking body is disposed in the opening such that an outlet port of the filling channel for the pressurized gas is oriented toward an inner side of the housing, while an inlet port of the filling channel for the pressurized gas is oriented toward an outer side of the housing, so that an interior and an exterior of the housing are communicated with each other through the filling channel;
    a blocking body abutment step which is after the blocking body setting step and in which the blocking body is abutted against a peripheral edge of the opening so as to ensure sealability between the blocking body and the peripheral edge of the opening;

a filling nozzle disposing step which is after or simultaneously with the blocking body abutment step and in which a filling nozzle injecting the pressurized gas is pressed against a periphery of the inlet port of the blocking body so as to ensure sealability;

a pressurized gas filling step which is after the filling nozzle disposing step and in which the pressurized gas is injected from the filling nozzle to fill the pressurized gas into the housing through the filling channel;

a filling channel blocking step which is after the pressurized gas filling step and in which the blocking body is energized with a resistance-welding current so as to block the filling channel by fusion-solidifying an inner peripheral surface of the filling channel, to thereby resistance-weld the inner peripheral portion of the filling channel; and a blocking body fixing step for fixing the blocking body to the peripheral edge of the opening so as to allow sealability to be maintained, wherein the blocking body fixing step is performed simultaneously with the blocking body abutment step or after the blocking body abutment step, and wherein when the filling nozzle is brought into pressure contact with the periphery of the inlet port of the blocking body, the filling nozzle presses the blocking body itself against the peripheral edge of the opening while in abutment therewith, so that the filling nozzle disposing step can be performed simultaneously with the blocking body abutment step.

6. The method of manufacturing an inflator according to claim 5, wherein an end portion of the blocking body on the outlet port side of the filling channel is formed into a tapered shape so as to be inserted into an inner peripheral side of the opening and to allow its outer peripheral surface to be brought into pressure contact with an entire circumference of the peripheral edge of the opening while ensuring sealability at the time of pressing in an inserting direction.

7. The method of manufacturing an inflator according to claim 3, wherein the filling nozzle also serves as an electrode for resistance-welding which is used in the blocking body fixing step.

8. A method of manufacturing an inflator in which a pressurized gas for supplying to an air hag as an inflation gas is filled into a housing, comprising:

a housing preparing step in which the housing having an opening for filling the pressurized gas is provided;

a blocking body preparing step in which a blocking body which blocks the opening and through which a filling channel filling the pressurized gas into the housing is provided;

a blocking body setting step which is after the housing preparing step and the blocking body preparing step and in which the blocking body is disposed in the opening such that an outlet port of the filling channel for the pressurized gas is oriented toward an inner side of the housing, while an inlet port of the filling channel for the pressurized gas is oriented toward an outer side of the housing, so that an interior and an exterior of the housing are communicated with each other through the filling channel;

a blocking body abutment step which is after the blocking body setting step and in which the blocking body is abutted against a peripheral edge of the opening so as to ensure sealability between the blocking body and the peripheral edge of the opening;

a filling nozzle disposing step which is after or simultaneously with the blocking body abutment step and in which a filling nozzle injecting the pressurized gas is pressed against a periphery of the inlet port of the blocking body so as to ensure sealability;

a pressurized gas filling step which is after the filling nozzle disposing step and in which the pressurized gas is injected from the filling nozzle to fill the pressurized gas into the housing through the filling channel;

a filling channel blocking step which is after the pressurized gas filling step and in which the blocking body is energized with a resistance-welding current and the blocking body is welded to the housing and the filling channel is welded shut; and a blocking body fixing step for fixing the blocking body to the peripheral edge of the opening so as to allow sealability to be maintained, wherein the blocking body fixing step is performed simultaneously with the blocking body abutment step or after the blocking body abutment step, and wherein the filling nozzle also serves as an electrode for resistance-welding which is used in the filling channel blocking step.

* * * * *